US012624944B2

(12) United States Patent
Daniel et al.

(10) Patent No.: US 12,624,944 B2
(45) Date of Patent: May 12, 2026

(54) AUTONOMOUS UAS DATA ACQUISITION WITH CONTEXT AWARENESS

(71) Applicant: VHIVE TECH LTD, Herzliya (IL)

(72) Inventors: Tomer Daniel, Givatayim (IL); Amir Jacob Shenhav, Raanana (IL); Doron Fine, Rishon Le-Zion (IL); Hadas Bar-David, Petah Tikva (IL)

(73) Assignee: VHIVE TECH LTD, Herzliya (IL)

( * ) Notice: Subject to any disclaimer, the term of this patent is extended or adjusted under 35 U.S.C. 154(b) by 289 days.

(21) Appl. No.: 18/686,863

(22) PCT Filed: Aug. 23, 2022

(86) PCT No.: PCT/IL2022/050919
§ 371 (c)(1),
(2) Date: Feb. 26, 2024

(87) PCT Pub. No.: WO2023/026284
PCT Pub. Date: Mar. 2, 2023

(65) Prior Publication Data
US 2024/0377197 A1      Nov. 14, 2024

(30) Foreign Application Priority Data
Aug. 25, 2021      (IT) ........................ 102021000022310

(51) Int. Cl.
*G01C 11/34*      (2006.01)
*G01C 5/02*      (2006.01)
(Continued)

(52) U.S. Cl.
CPC ................ *G01C 11/34* (2013.01); *G01C 5/02* (2013.01); *G06V 10/82* (2022.01); *G06V 20/17* (2022.01); *G06V 2201/07* (2022.01)

(58) Field of Classification Search
CPC .......... G01C 11/34; G01C 5/02; G06V 20/17; G06V 10/82; G06V 2201/07
See application file for complete search history.

(56) References Cited

U.S. PATENT DOCUMENTS 9,513,635 B1 *   12/2016   Bethke ................. G05D 1/0094
11,725,940 B2 *   8/2023   Michini ................. G01C 15/02
                                                              701/25
(Continued)

FOREIGN PATENT DOCUMENTS

CA      2994511 C   *   1/2020   ............. G06T 17/05
CN      112596071 A       4/2021
(Continued)

OTHER PUBLICATIONS

Loyola et al., 2021, "Unmanned Aerial Vehicles (UAVs) for Physical Progress Monitoring of Construction" (pp. 1-27) (Year: 2021).*
(Continued)

*Primary Examiner* — Manav Seth
(74) *Attorney, Agent, or Firm* — NKL Law; Jae Youn Kim

(57) ABSTRACT

A system and methods are provided for generating photogrammetry data acquisition plans of target structures, including: establishing a location and orientation of the target structure; identifying on the target structure predetermined target objects designated for data acquisition; correlating shapes, locations, and orientations of the target objects with the shape, location, and orientation of the target structure; and applying the shapes, locations, and orientations of the target structure and of the target objects, to generate a data acquisition plan for drone photogrammetry of the target structure and of the target objects.

20 Claims, 5 Drawing Sheets

(51) Int. Cl.
  *G06V 10/82* (2022.01)
  *G06V 20/17* (2022.01)

(56) References Cited

U.S. PATENT DOCUMENTS

| | | | | |
|---|---|---|---|---|
| 11,852,461 | B2 * | 12/2023 | Bernstein | A61B 1/00167 |
| 12,504,454 | B2 * | 12/2025 | Blanc-Paques | G01R 29/085 |
| 2012/0262708 | A1 * | 10/2012 | Connolly | G01N 21/88 |
| | | | | 701/2 |
| 2016/0202695 | A1 * | 7/2016 | Deroos | G08G 5/74 |
| | | | | 701/2 |
| 2017/0067734 | A1 * | 3/2017 | Heidemann | G01B 11/2513 |
| 2017/0193829 | A1 * | 7/2017 | Bauer | G06T 17/05 |
| 2017/0208245 | A1 * | 7/2017 | Castillo | H04N 1/2104 |
| 2017/0329297 | A1 * | 11/2017 | Gilman | G05B 19/4097 |
| 2018/0003161 | A1 * | 1/2018 | Michini | G06T 7/0004 |
| 2018/0004207 | A1 * | 1/2018 | Michini | G05D 1/0088 |
| 2018/0004231 | A1 * | 1/2018 | Michini | G01C 21/20 |
| 2018/0144644 | A1 * | 5/2018 | Heinonen | G01S 19/13 |
| 2018/0267561 | A1 * | 9/2018 | Trench | G05D 1/0094 |
| 2019/0066317 | A1 * | 2/2019 | Chang | G05D 1/0094 |
| 2020/0202183 | A1 * | 6/2020 | Taylor | G01C 11/06 |

FOREIGN PATENT DOCUMENTS

| | | | | |
|---|---|---|---|---|
| EP | 4093671 | B1 * | 12/2024 | B64D 31/06 |
| WO | WO-2012044297 | A1 * | 4/2012 | G05D 1/0088 |

OTHER PUBLICATIONS

Buffi et al., 2017, "Survey of the Ridracoli Dam: UAV-based photogrammetry and traditional topographic techniques in the inspection of vertical structure" (pp. 1562-1579). (Year: 2017).*

Nex et al., 2014, "UAV for 3D mapping applications" a review (pp. 1-15). (Year: 2014).*

Jordan Sophie et al. "State-of the-art technologies for UAV inspections" IET Radar Sonar Navigation, The Institution of Engineering and Technology, UK; IET Journal vol. 12, No. 2—Feb. 1, 2018, pp. 151-164; 14 pages.

* cited by examiner

100

102

112

110

106

114

116

104

120

112

110

110

116

110

112

110

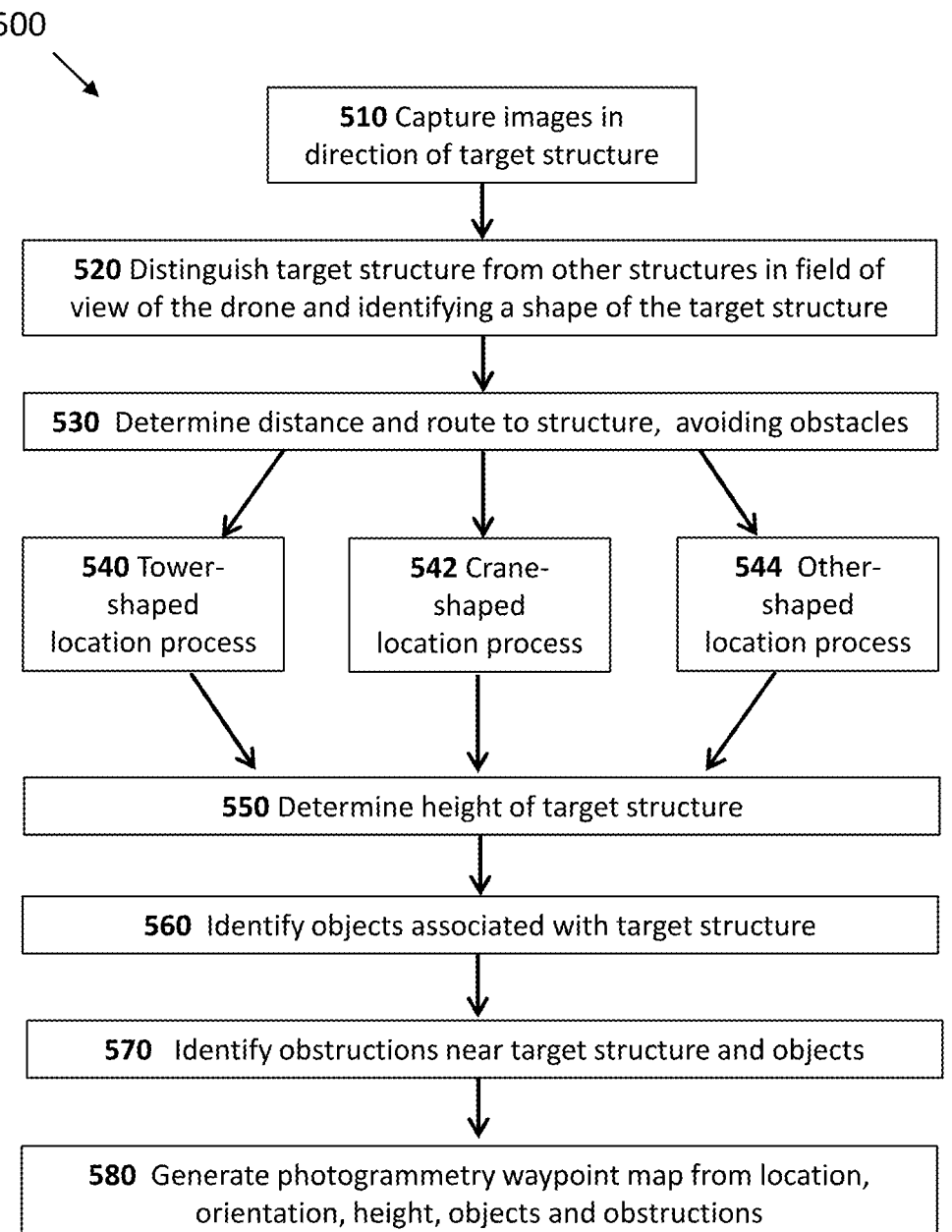

500

510 Capture images in direction of target structure

520 Distinguish target structure from other structures in field of view of the drone and identifying a shape of the target structure

530 Determine distance and route to structure, avoiding obstacles

540 Tower-shaped location process

542 Crane-shaped location process

544 Other-shaped location process

550 Determine height of target structure

560 Identify objects associated with target structure

570 Identify obstructions near target structure and objects

580 Generate photogrammetry waypoint map from location, orientation, height, objects and obstructions

Fig. 5

AUTONOMOUS UAS DATA ACQUISITION WITH CONTEXT AWARENESS

CROSS REFERENCE TO RELATED APPLICATIONS

This application is a national phase entry of International Patent Application No. PCT/IL2022/050919, titled, "AUTONOMOUS UAS DATA ACQUISITION WITH CONTEXT AWARENESS," filed Aug. 23, 2022, which claims the benefit under 35 U.S.C. § 119 (b) to Italian Patent Application No. IT102021000022310A, filed Aug. 25, 2021, the entire contents of which are hereby incorporated by reference.

FIELD OF THE INVENTION

The invention generally relates to built environment data acquisition, particularly by unmanned aerial systems.

BACKGROUND

Photogrammetry has developed into an important field for supporting the construction and maintenance of large structures of the built environment. Applications range from photogrammetry of permanent structures such as buildings, high power transmission lines, and antenna towers, to temporary structures, such as cranes, and remote structures, such as oil platforms. Based on photogrammetry image sets, 3D representations of the structures may be generated, which may then be used for analyzing the structures and their associated accessories. Analyses of 3D representations generated by photogrammetry may then be used for developing plans for construction and for maintenance, as well as navigation plans for related drone inspections.

Unmanned aerial systems (UAS's), also referred to herein as drones, have thus far proven to be effective at inspecting built assets, especially in the construction, electricity, telecommunications, and transportation industries. However, developing navigation plans for photogrammetry by drones remains a time-consuming process. Data acquisition plans are generally defined as a set of waypoints, i.e., 3D coordinates, that specify all the points in space and associated orientations from which a drone should take images of a target structure. Improved processes for developing such photogrammetry data acquisition plans, as disclosed hereinbelow, may reduce costs and improve results of photogrammetry of built assets.

SUMMARY

Embodiments of the present invention provide a system and methods for generating drone data acquisition plans for photogrammetry of built structures. Embodiments include a computing system having at least one processor and non-transient memory storage communicatively coupled to the at least one processor. When the instructions are executed by the at least one processor, the computing system implements steps of: 1) capturing images taken by a drone flying in the direction of a target structure (after launch of the drone); 2) image processing of the captured images, to distinguish the target structure from other structures in a field of view of the drone and identifying a shape of the target structure; 3) establishing a location of the target structure and an orientation of the target structure, (a) by identifying a center-of-tower location and by identifying guy tower anchors, when the target structure is tower-shaped, (b) by identifying a crane tip and a crane base, when the target structure is crane-shaped, and (c) by identifying coordinates of two or more corners of a predefined location of the structure, when the structure is not tower or crane-shaped; 4) identifying on the target structure predetermined target objects designated for data acquisition; 5) correlating the target structure and the target objects in 3D space by correlating their respective shapes, locations, and orientations; and 6) generating a data acquisition plan for drone photogrammetry of the target structure, wherein the data acquisition plan includes 3D coordinates of photogrammetry positions and orientations set at pre-defined distances and orientations from the correlated target structure and target objects.

Some embodiments may further include identifying obstacles among the other structures, estimating locations and elevations of the obstacles, and planning a flight path to the target structure avoiding the identified obstacles. The image processing may also include estimating a distance from the drone to the target structure and planning a flight path to the target structure according to the estimated distance. Some embodiments may also include a configuration for identifying one or more obstacles in the vicinity of the target structure that may obstruct flight of a drone performing photogrammetry, and applying shapes, locations, and orientations of the one or more obstacles as additional parameters to generate the data acquisition plan for drone photogrammetry.

Some embodiments may further include estimating the height of the target structure, and applying the height as an additional parameter for generating the data acquisition plan. The height estimation may be performed by stereoscopic and/or triangulation methods. The stereoscopic and/or triangulation methods may include feature-based computer vision algorithms for image matching, registration, camera calibration, warping, fundamental matrix calculation, disparity calculation, via structure from motion or structured light, and laser pointing methods. The height estimation may also be achieved by flying the drone to a height where the target structure is viewed exactly on the horizon line, and setting the height estimation to the height of the drone.

Some embodiments may further include identifying the shape of the target structure by a set of thresholding and morphological operations and/or a feature-based, object-detection neural network algorithm.

Establishing the location of the target structure may include flying the drone above the target structure and aligning the drone such that when taking a picture of the target structure, the target structure is in the center of the picture, and the location of the target structure is set to coordinates of the drone projected to the ground.

BRIEF DESCRIPTION OF DRAWINGS

For a better understanding of various embodiments of the invention and to show how the same may be carried into effect, reference will now be made, by way of example, to the accompanying drawings. Structural details of the invention are shown to provide a fundamental understanding of the invention, the description, taken with the drawings, making apparent to those skilled in the art how the several forms of the invention may be embodied in practice.

In the Accompanying Drawings:

FIG. 5 is a flow chart of a process of generating drone data acquisition plans for photogrammetry, in accordance with some embodiments of the present invention.

DETAILED DESCRIPTION

Figure 1A:
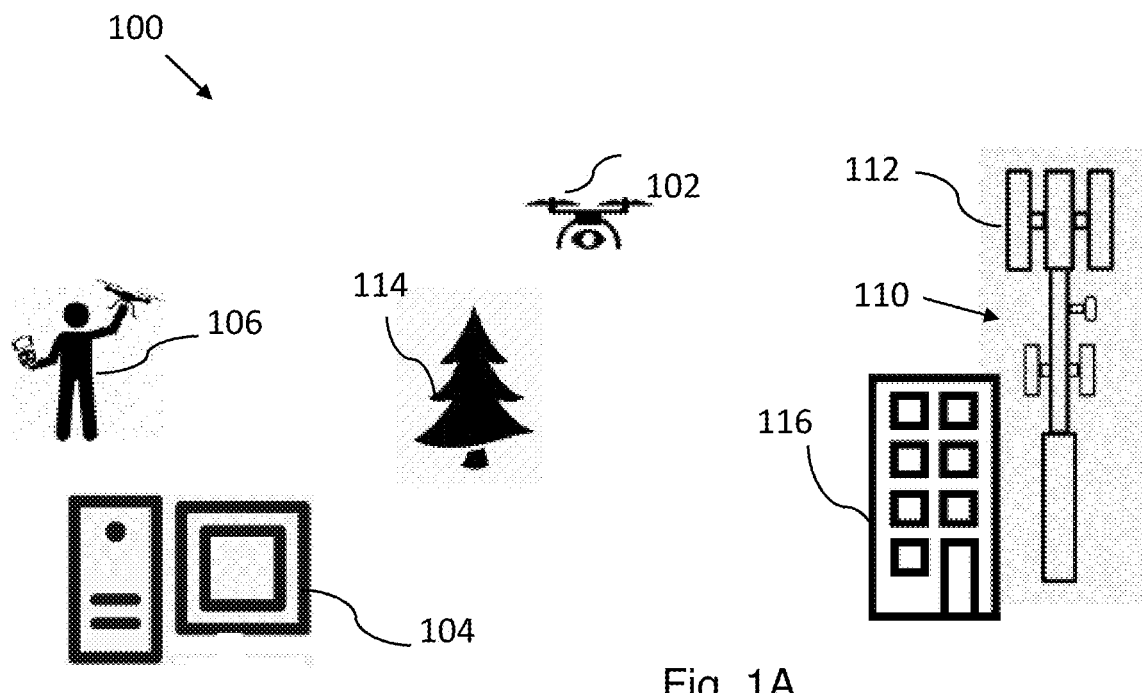
FIG. 1A is a schematic illustration of a system for generating data acquisition plans for photogrammetry of built structures, in accordance with some embodiments of the present invention.

It is to be understood that the invention and its application are not limited to the system and methods described below or to the arrangement of the components set forth or illustrated in the drawings, but are applicable to other embodiments that may be practiced or carried out in various ways.

Embodiments of the present invention provide methods for drone acquisition of data of target structures in the built environment ("built assets"). The data may be subsequently used to generate drone data acquisition plans (i.e., "waypoints") for photogrammetry. Drone data acquisition methods include identifying aspects of the environment of target structures (i.e., the data acquisition "context") such as structure geometry, location, and immediate surroundings in real time, such that data acquisition is performed with "context awareness." A drone configured to acquire the required data for generating waypoints for photogrammetry, as described herein, is configured for autonomous navigation to the target structure, with obstacle avoidance and processing to compensate for incorrect location and/or height specifications of the target structure. The generated photogrammetry data acquisition plan ensures that an efficient set of photogrammetry images is captured, at a distance from the target structure that provides optimal resolution. Autonomous navigation and data acquisition also results in faster data acquisition missions.

FIG. 1A is a schematic illustration of a system 100 for generating drone data acquisition plans for photogrammetry of built structures, in accordance with some embodiments of the present invention. The system includes a drone 102 (i.e., an unmanned aerial vehicle, or UAV) that typically includes common features of modern drones, including a camera, rotors, a battery and a processor. In some embodiments, the drone may be a quadcopter. Typically the camera includes a lens and an image sensor, and may be supported by a multi-axis gimbal for acquiring images at different orientations with respect to the drone body. The drone may also include image stabilization circuitry that processes images acquired by the camera. The drone is typically configured to wirelessly transmit image data from the camera to a ground controller 104, as well as to receive instructions from such a controller, which may be automated or operated by a human operator 106. In some embodiments, the controller is a distributed computing system, such as a cloud-based computing service. As described further hereinbelow, the drone may also include a distance sensor, such as a lidar or radar sensor.

In typical operation, the drone 102 is released in the direction of a target structure 110. As described above, a wide range of structure may be modelled by photogrammetry, including buildings, high power transmission lines, antenna towers, and construction cranes. Typically such structures include accessories 112, which are typically objects of particular interest for analysis, such as wireless transmitters. During flight, the drone 102 navigates toward the target structure and then encircles the structure to acquire data regarding the structure's location, dimensions, and accessory objects. This data is then processed, 104, by methods described hereinbelow, to create a photogrammetry data acquisition plan. During the navigation of the drone to the target structure, obstacles 114 may obstruct the flight path. The drone is typically configured to identify such obstructions and to avoid them. In addition, when encircling the target structure, close obstacles 116 may also need to be avoided. Image data of close obstacles 116 may also be included in the parameters that are processed to generate photogrammetry data acquisition plans.

Figure 1B:
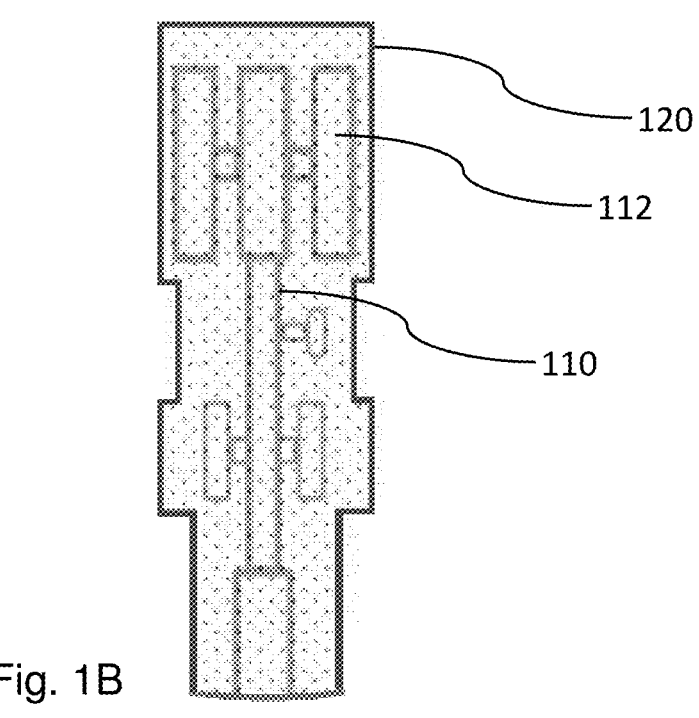
FIG. 1B is a schematic illustration of a drone data acquisition plan for photogrammetry of built structures, generated in accordance with some embodiments of the present invention.

FIG. 1B is a schematic illustration of a drone data acquisition plan 120 for photogrammetry of built structures, such as the target structure 110. Such a data acquisition plan is generated by the methods described hereinbelow with respect to FIGS. 2-5. For a cylindrical type of structure, such as an antenna tower, the ideal data acquisition plan is a set of 3D coordinates positioned along a surface of a hollow, virtual cylinder enveloping the structure. As indicated, the shape of the 3D coordinates of the data acquisition plan is modified according to accessory objects 112. The shape may also be modified to prevent drone collision with close obstacles 116.

The data acquisition plan typically indicates 3D coordinates of each position from which an image will be acquired, as well as a camera orientation at each position. Points are typically determined to ensure a high degree overlap (e.g., 60% to 90%) of acquired images, thereby ensuring that the multiple images can be "stitched" together by the photogrammetry process to generate accurate 3D models.

Figure 2:
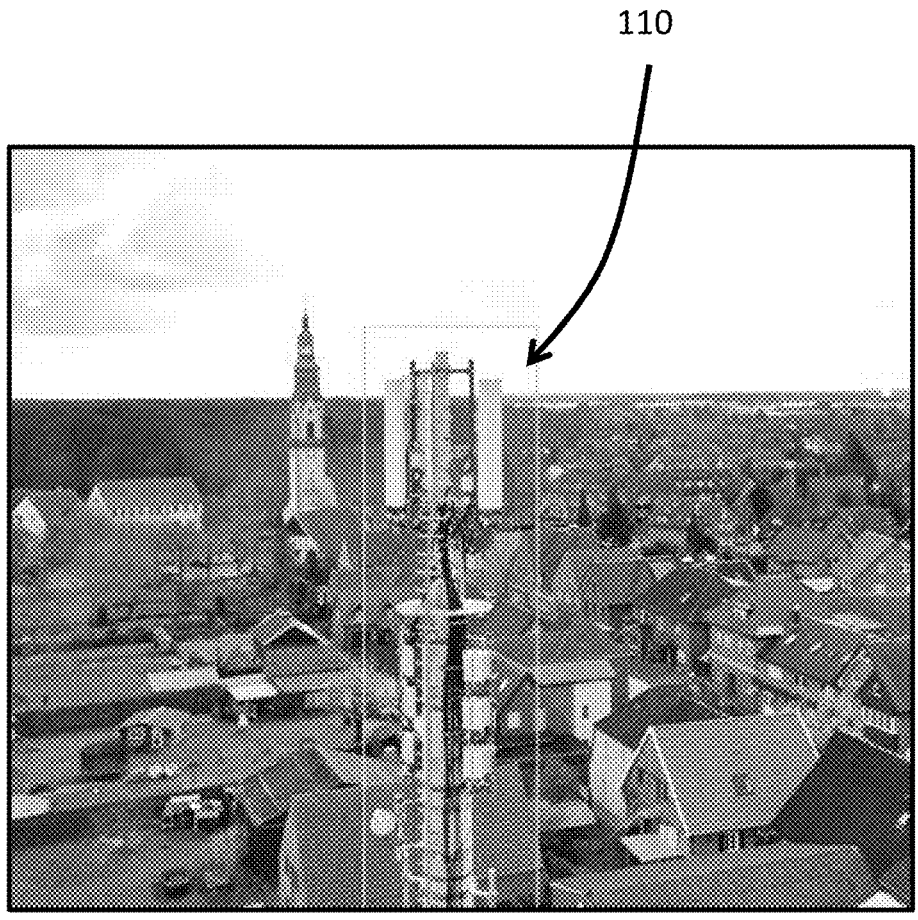
FIGS. 2-4 are illustrations of images acquired by a system for generating drone data acquisition plans for photogrammetry, in accordance with some embodiments of the present invention.
Figure 3:
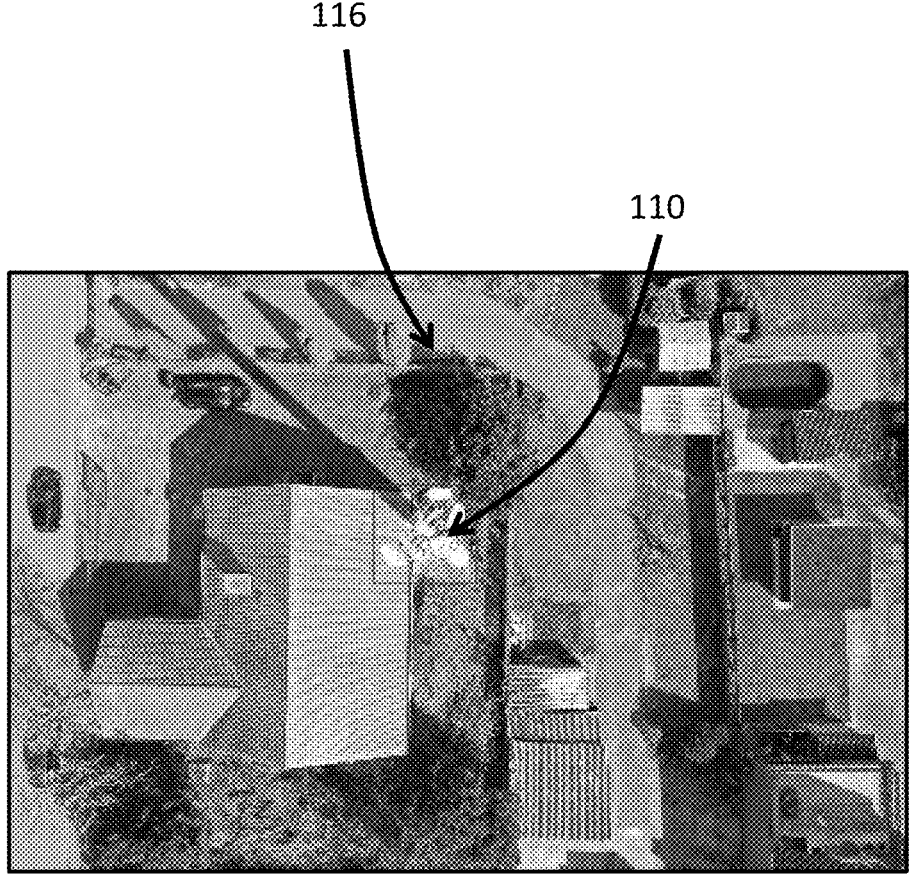
Figure 4:
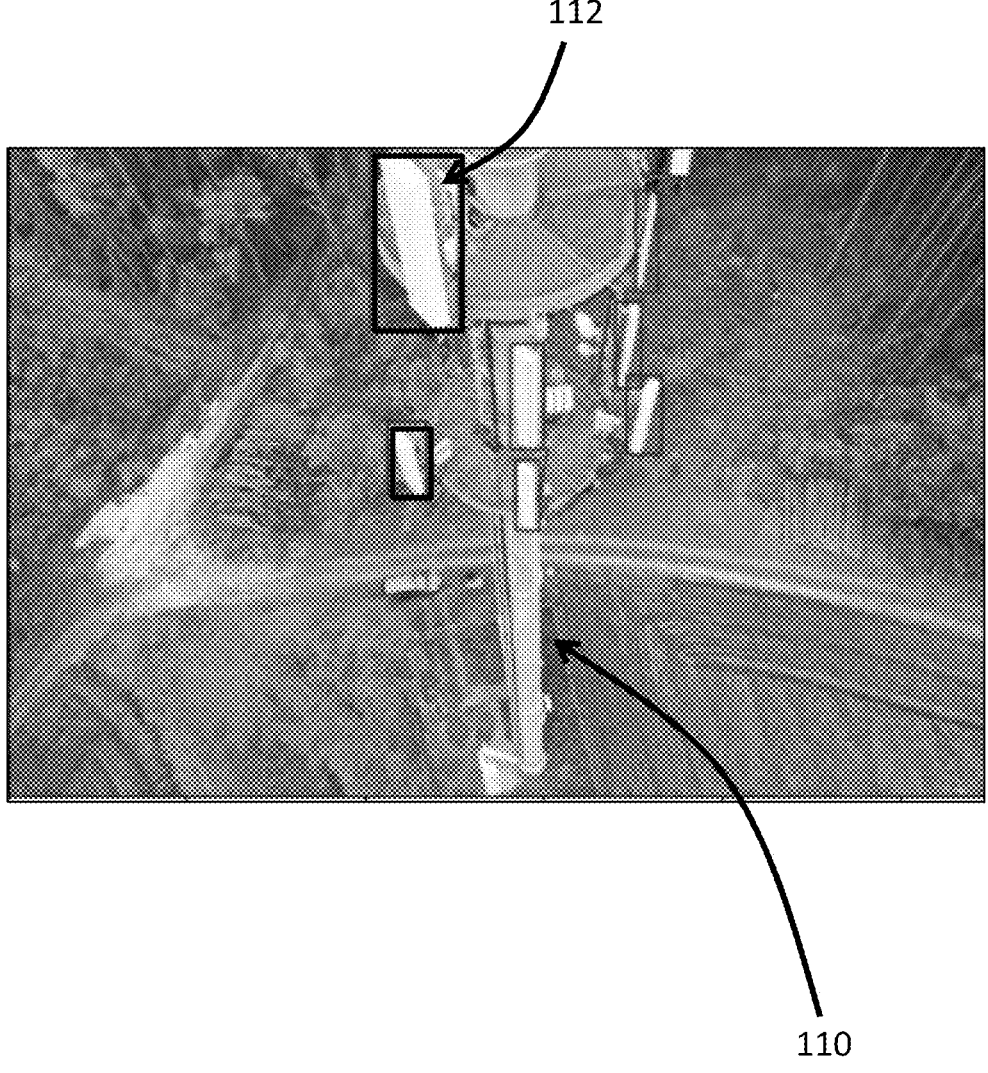

FIGS. 2-4 are illustrations of images acquired by a system for generating drone data acquisition plans for photogrammetry, in accordance with some embodiments of the present invention. As shown in FIG. 2, a target structure 110, in this case an antenna tower, is in an image acquired by a drone, that is, the target structure, as well as other structures, is in the "field of view" of the drone. The target structure is distinguished from among the other structures by image processing algorithms that may match known characteristics of the target structure, such as color, shape, unique geometry etc., or by other image processing methods including thresholding and morphological operations. Feature-based artificial intelligence methods may also be applied, based on, for example, on object detection neural network algorithms. The image processing algorithms and other algorithms described herein with respect to the navigation of the drone and determination of the photogrammetry waypoints are typically executed by the processor of the drone and/or of the ground controller.

After the target structure is distinguished from other structures in the field of view, an estimate is made as to the distance from the drone to the target structure. An exemplary algorithm may use stereoscopic and/or triangulation methods to produce a depth-map. Additional computer vision algorithms may apply methods of image matching, registration, camera calibration, warping, fundamental matrix calculations, or disparity calculations. Additional methods may be based on the structure, or may rely on motion or structured light and laser pointing methods. Finally, direct distance measurements may be obtained from on-board sensors such as lidar or radar sensors. Based on the estimated distance, the drone may be configured to autonomously fly to the site of the target structure. Methods of obstacle avoidance known in the art may be applied during the flight to enable the drone to avoid obstacles in the flight path, whether fixed or in motion (e.g., birds or other drones).

After the distance to the target structure is determined, a determination of the height of the object is made. One method is for the drone to fly to a height such that the top of the target structure aligns with the horizon in an image acquired by the drone. When the horizon aligns with the top of the target structure, the height of the drone is approximately the same as the height of the target. (See the top of the antenna tower at approximately the height of the horizon in photograph of FIG. 2.)

Additional methods for determining the height of the target structure are similar to those described above with respect to determining the distance of the drone from the target structure. Such methods may include use of stereoscopic and/or triangulation methods that produce a depth-map. Additional computer vision algorithms may apply methods of image matching, registration, camera calibration, warping, fundamental matrix calculations, or disparity calculations. The height of the target structure is an important parameter for generating the data acquisition plans, as the altitude of the flight plan is a function of the height of the structure.

After determining the height of the target structure, the drone determines a geographic location of the target structure. Object detection methods such as deep learning neural networks, or other feature-based computer vision methods may identify a correlation of a target structure to geo-tagged images, such as geo-tagged high resolution satellite images.

Alternatively, or additionally, an exact location may be determined by positioning the drone above the target structure. FIG. 3 shows a field of view of the drone taken from above the target structure 110. When thus aligned, X, Y coordinates of the drone are the same as the target structure X, Y coordinates.

Also shown in FIG. 3 is an example of an obstacle 116 in close proximity to the target structure. In addition to identifying the location of the target structure, such obstacles that may interfere with photogrammetry must be identified. Obstacle types may be identified based on characteristics of the objects, for example by means of image processing algorithms that identify color, shape, unique geometry, etc., or based on methods of thresholding or morphological operations. Artificial intelligence methods may be employed, such as feature-based, object detection neural network algorithms.

Heights and locations of obstacles may be determined based on methods similar to those described above for determining the heights of target structures. These include stereoscopic and/or triangulation methods that produce a depth-map. Additional computer vision algorithms may apply methods of image matching, registration, camera calibration, warping, fundamental matrix calculations, or disparity calculations. Additional methods may be based on the structure, or may rely on motion or structured light and laser pointing methods. These methods may be combined with self location measurement tools (such as GPS or orthophoto image rectification) in order to calculate the estimated obstacle location. An obstacle's height and location are additional important parameters for generating the data acquisition plan.

Locations and heights may also be obtained directly from a digital terrain model (DTM). The DTM may be a publicly available model or one generated by a pre-flight process, typically requiring a prior drone flight. It is to be understood that obstacles described above are assumed to be fixed (i.e., static) obstacles. Dynamic obstacles (e.g., birds in flight)

should also be identified while a drone is in flight. Moving obstacle avoidance may be achieved using on-board sensors and Sense-and-Avoid algorithms, which can be used to provide alerts of safety issues related to a given flight mission.

FIG. 4 shows accessory objects 112 of a target structure 110 identified in an image acquired by a drone. Such objects may be identified by image processing methods that identify object geometry. Such methods may be applied to identify objects such as, for towers, tower guy wires, self-support base platforms, and tower level protrusions, or, for cranes, boom and jib lengths and angles.

Additional object characteristics that may be used for geometry matching may include color, shape, specific geometry, etc., or may be based on thresholding, or on morphological operations. Artificial intelligence methods may be employed, such as feature-based, object detection neural network algorithms, including deep learning neural networks. Object detection includes determination of elevation and location, by methods described above with respect to the target structure itself. Object detection also establishes orientation of a target structure with respect to such features. It should be noted that object detection may be executed in real time or pre-flight, and may use either ground computing (e.g., a ground controller or a cloud computing service) and/or drone-based ("on-board") processing. All of these processes can be implemented as manual, semi-autonomous, or fully autonomous steps.

FIG. 5 is a flow chart of a process 500 of generating drone data acquisition plans for photogrammetry of target structures, in accordance with some embodiments of the present invention.

Typically, before the steps of process 500 are performed, characteristics of a target structure are entered into a built asset database. Such characteristics may include identifiable characteristics of target structures and their associated objects.

Next, a drone is launched, typically in a direction of the target structure, such that the target structure is in a forward facing field of view of the drone. At a step 510, images are captured by the drone in flight.

At a step 520, by image processing of the captured images as described above, the target structure is distinguished from other structures in the field of view of the drone. Typically, distinguishing the target structure also includes identifying a shape of the target structure, which may be, for example, tower shaped, crane shaped, or have a different shape that may be a catch-all of other shapes. Identifying the shape may be implemented by a set of thresholding and morphological operations and/or a feature-based, object-detection neural network algorithm.

At a step 530, flight of the drone towards the target structure proceeds after a distance from the drone to the target structure is determined by methods described above. According to the estimated distance, the drone proceeds towards the target structure, typically by autonomous (i.e., self-determined) control. Along the flight path, obstacles may be identified by image processing and/or other presence detection methods known in the art. Locations and elevations of such obstacles may be determined, and the flight path to the target structure may be navigated to avoid the identified obstacles.

At steps 540, 542, and 544, a location of the target structure may be determined by methods associated with a shape of the target structure. When the target structure is tower-shaped (step 540), the location may be determined by identifying a center-of-tower location and by identifying guy tower anchors. The center-of-tower location may be determined by flying the drone above the target structure and aligning the drone such that when taking a picture of the target structure, the target structure is in the center of the picture. At this flight position of the drone, the location of the target structure may be set to the coordinates of the drone projected to the ground (i.e., the X, Y coordinates of the drone, in three-dimensional X, Y, Z space coordinates).

When the target structure is crane-shaped (step 542), the location may be identified by identifying a crane tip and a crane base in acquired images. When the target structure has a different shape, that is, neither tower nor crane-shaped (step 544) the location may be determined by identifying coordinates of two or more corners of a predefined location of the structure.

Next, at a step 550, a height of the target structure is estimated, as the height is as an additional parameter for generating the photogrammetry data acquisition plan. In some embodiments, the height estimation is achieved via stereoscopic and/or triangulation methods. Stereoscopic and/or triangulation methods may include feature-based computer vision algorithms for image matching, registration, camera calibration, warping, fundamental matrix calculation, disparity calculation, via structure from motion or structured light, and laser pointing methods.

Alternatively, or additionally, the height estimation is achieved by flying the drone to a height where the target structure is viewed on the horizon line, and setting the height estimation to the height of the drone.

Next, at a step 560, target ancillary objects on the target structure are identified in acquired images. Typically, the ancillary objects (such as platforms, transmitters, etc.) are previously designated as objects requiring identification. Characteristics of such objects may be predefined in a built asset database. Characteristics may include shapes, colors locations, and orientations of the target objects, and identification may include correlating measured shapes, colors locations, and orientations with the corresponding predefined characteristics.

At a step 570, one or more obstacles in the vicinity of the target structure are identified, by methods described above, such obstacles being any objects that may obstruct a flight of a drone performing photogrammetry. The shapes, locations, and orientations of the one or more obstacles may be included in parameters used to generate the data acquisition plan for drone photogrammetry.

Finally, at a step 580, the shapes, locations, and orientations of the target structures, of the target objects, and of any obstacles are correlated in 3D space by correlating their respective shapes, locations, and orientations. Based on the 3-D correlated target structure and target objects, a data acquisition plan for drone photogrammetry of the target structure is then generated. The data acquisition plan includes 3D coordinates of photogrammetry positions and orientations, which are set at pre-defined distances and orientations from the 3-D correlated target structure and target objects.

Images acquired by a subsequent photogrammetry mission, according to the data acquisition plan, may be applied to generate a 3D model of the target structure, to be used in subsequent analysis and planning, such as for construction and maintenance work.

Although the invention has been described in detail, nevertheless, changes and modifications, which do not depart from the teachings of the present invention, will be evident to those skilled in the art. Such changes and modifications are deemed to come within the purview of the present invention and the appended claims. It will be readily apparent that the various methods and algorithms described herein may be implemented by, e.g., appropriately programmed general purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" may be any one or more microprocessors, central processing units (CPUs), computing devices, microcontrollers, digital signal processors, or like devices. Computer memory may be, but is not limited to, non-volatile media that may include, for example, optical or magnetic disks and other persistent memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

Sequences of instructions may be delivered from memory to a processor, may be carried over a wireless transmission medium, and/or may be formatted according to numerous formats, standards or protocols, such as Bluetooth, TDMA, CDMA, 3G.

Any illustrations or descriptions of arrangements for stored representations of information may be implemented by any number of arrangements, e.g., tables, files, or databases. Similarly, any illustrated entries of the stored data represent exemplary information only; one of ordinary skill in the art will understand that the number and content of the entries can be different from those described herein. Further, despite any depiction of stored data as databases or tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses such data.

The present invention can be configured to work in a network environment including a computer that is in communication, via a communications network, with one or more devices. The computer may communicate with the devices directly or indirectly, via a wired or wireless medium such as the Internet, LAN, WAN, Wi-Fi or via any appropriate communications means or combination of communications means.

The invention claimed is:

1. A computing system comprising at least one processor and non-transient memory storage communicatively coupled to the at least one processor and comprising computer-readable instructions that when executed by the at least one processor cause the computing system to implement steps of, after launch of a drone, capturing images taken by the drone in the direction of a target structure and, by image processing of the captured images:

(i) distinguishing the target structure from other structures in a field of view of the drone and identifying a shape of the target structure;

(ii) establishing a location of the target structure and an orientation of the target structure, (a) by identifying a center-of-tower location and by identifying guy tower anchors, when the target structure is tower-shaped, (b) by identifying a crane tip and a crane base, when the target structure is crane-shaped, and (c) by identifying coordinates of two or more corners of a predefined location of the structure, when the structure is not tower or crane-shaped;

(iii) identifying on the target structure predetermined target objects designated for data acquisition;

(iv) correlating the target structure and the target objects in 3D space by correlating their respective shapes, locations, and orientations; and (v) generating a data acquisition plan for drone photo-grammetry of the target structure, wherein the data acquisition plan includes 3D coordinates of photogram-metry positions and orientations set at pre-defined distances and orientations from the correlated target structure and target objects.

2. The computing system according to claim 1, further comprising identifying obstacles among the other structures, estimating locations and elevations of the obstacles, and planning a flight path to the target structure avoiding the identified obstacles.

3. The computing system according to claim 1, further comprising estimating a distance from the drone to the target structure and planning a flight path to the target structure according to the estimated distance.

4. The computing system according to claim 1, further comprising identifying one or more obstacles in the vicinity of the target structure that may obstruct flight of a drone performing photogrammetry, and applying shapes, locations, and orientations of the one or more obstacles as additional parameters to generate the data acquisition plan for drone photogrammetry.

5. The computing system according to claim 1, further comprising estimating a height of the target structure, and applying the height as an additional parameter for generating the data acquisition plan.

6. The computing system according to claim 5, wherein the height estimation is achieved via stereoscopic and/or triangulation methods.

7. The computing system according to claim 6, wherein said stereoscopic and/or triangulation methods comprise feature-based computer vision algorithms for image match-ing, registration, camera calibration, warping, fundamental matrix calculation, disparity calculation, via structure from motion or structured light, and laser pointing methods.

8. The computing system according to claim 5, wherein the height estimation is achieved by flying the drone to a height where the target structure is viewed exactly on the horizon line, and setting the height estimation to the height of the drone.

9. The computing system according to claim 1, wherein identifying the shape of the target structure comprises iden-tifying the shape by a set of thresholding and morphological operations and/or a feature-based, object-detection neural network algorithm.

10. The computing system according to claim 1, wherein establishing the location of the target structure further com-prises flying the drone above the target structure and align-ing the drone such that when taking a picture of the target structure, the target structure is in the center of the picture, and setting the location to coordinates of the drone projected to the ground.

11. A method of photogrammetry comprising, after launch of a drone, capturing images taken by the drone in the direction of a target structure and, by image processing of the captured images, performing steps of:

(i) distinguishing the target structure from other structures in a field of view of the drone and identifying a shape of the target structure;

(ii) establishing a location of the target structure and an orientation of the target structure, (a) by identifying a center-of-tower location and by identifying guy tower anchors, when the target structure is tower-shaped, (b) by identifying a crane tip and a crane base, when the target structure is crane-shaped, and (c) by identifying coordinates of two or more corners of a predefined location of the structure, when the structure is not tower or crane-shaped;

(iii) identifying on the target structure predetermined target objects designated for data acquisition;

(iv) correlating the target structure and the target objects in 3D space by correlating their respective shapes, locations, and orientations; and (v) generating a data acquisition plan for drone photo-grammetry of the target structure, wherein the data acquisition plan includes 3D coordinates of photogram-metry positions and orientations set at pre-defined distances and orientations from the correlated target structure and target objects.

12. The method of claim 11, further comprising identify-ing obstacles among the other structures, estimating loca-tions and elevations of the obstacles, and planning a flight path to the target structure avoiding the identified obstacles.

13. The method of claim 11, further comprising estimat-ing a distance from the drone to the target structure and planning a flight path to the target structure according to the estimated distance.

14. The method of claim 11, further comprising identify-ing one or more obstacles in the vicinity of the target structure that may obstruct flight of a drone performing photogrammetry, and applying shapes, locations, and orien-tations of the one or more obstacles as additional parameters to generate the data acquisition plan for drone photogram-metry.

15. The method of claim 11, further comprising estimat-ing a height of the target structure, and applying the height as an additional parameter for generating the data acquisi-tion plan.

16. The method of claim 15, wherein the height estimation is achieved via stereoscopic and/or triangulation methods.

17. The method of claim 16, wherein said stereoscopic and/or triangulation methods comprise feature-based com-puter vision algorithms for image matching, registration, camera calibration, warping, fundamental matrix calcula-tion, disparity calculation, via structure from motion or structured light, and laser pointing methods.

18. The method of claim 15, wherein the height estimation is achieved by flying the drone to a height where the target structure is viewed exactly on the horizon line, and setting the height estimation to the height of the drone.

19. The method of claim 11, wherein identifying the shape of the target structure comprises identifying the shape by a set of thresholding and morphological operations and/or a feature-based, object-detection neural network algorithm.

20. The method of claim 11, wherein establishing the location of the target structure further comprises flying the drone above the target structure and aligning the drone such that when taking a picture of the target structure, the target structure is in the center of the picture, and setting the location to coordinates of the drone projected to the ground.

\*  \*  \*  \*  \*